Dec. 19, 1950     G. B. STILLWAGON, JR     2,534,635
COVER FOR UNIVERSAL JOINTS
Filed Dec. 23, 1944
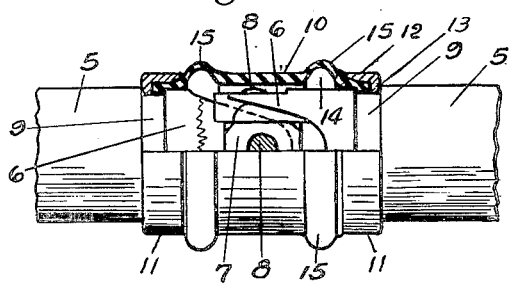
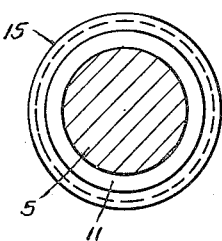
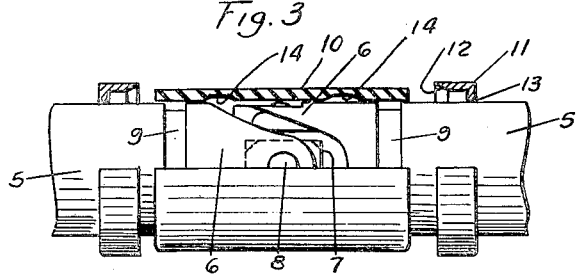
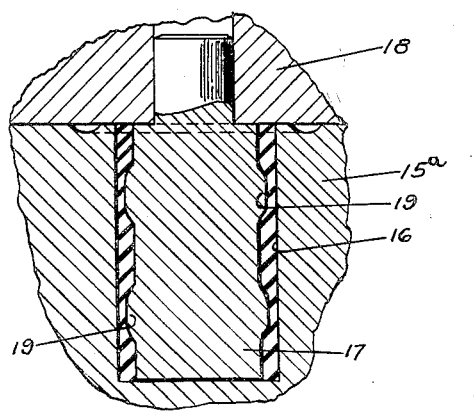
INVENTOR.
GEORGE B. STILLWAGON JR.

Patented Dec. 19, 1950

2,534,635

UNITED STATES PATENT OFFICE 2,534,635

COVER FOR UNIVERSAL JOINTS

George B. Stillwagon, Jr., Dayton, Ohio, assignor of one-half to Kenneth G. Fraser, Dayton, Ohio Application December 23, 1944, Serial No. 569,459

6 Claims. (Cl. 64—32)

This invention relates to a flexible cover for a universal joint and is an improvement on the cover shown and described in the Stillwagon and Fraser Patent No. 2,264,728, granted December 2, 1941.

The cover shown in Fig. 1 of that patent has been very satisfactory in service but its shape is such that it is difficult to mold and as a result the molding operation is slow and the molded pieces are frequently defective and are sometimes destroyed in removing the same from the mold, thus rendering the production of the cover expensive. Further, the shape of the cover is such as to materially increase the overall diameter of the covered joint and to prohibit its use in installations where the joint must operate in a restricted space.

One object of the invention is to provide a flexible cover for a universal joint which has the essential characteristics of the patented cover, as well as additional advantages and characteristics, and can be easily produced with a minimum of defective pieces.

A further object of the invention is to provide such a cover which does not materially increase the over-all diameter of the covered joint.

A further object of the invention is to provide a small diameter cover having the necessary flexibility and the flexing of which is so controlled that predetermined portions thereof will flex outwardly.

A further object of the invention is to provide such a cover which will be subject to little or no stress tending to separate the flexible structure from the attaching devices.

A further object of the invention is to provide a cover which materially reduces the relative movement of the coupling members due to vibration of the joint and which offers little or no resistance to the operative pivotal movement of the coupling members.

A further object of the invention is to provide such a cover with attaching means which subject the flexible structure to and maintain the same under longitudinal compression.

A further object of the invention is to provide such a cover the flexible structure of which is substantially cylindrical and can be produced at low cost.

Other objects of the invention may appear as the device is described in detail.

In the accompanying drawings Fig. 1 is a side elevation, partly in section, of a cover embodying my invention and showing the same applied to a universal joint; Fig. 2 is an end view of the cover as shown in Fig. 1; Fig. 3 is an elevation, partly in section, of the cover showing the same in position on the universal joint prior to being attached thereto; and Fig. 4 is a sectional view of a mold in which the flexible structure of the cover may be produced.

In these drawings I have illustrated one embodiment of the invention and have shown the same as applied to a universal joint of a well known construction but it is to be understood that the cover may take various forms and may be applied to universal joints of various kinds. The main purpose of the cover for a universal joint is two fold; to prevent dust or other foreign matter from entering the pivot bearings, to prevent condensation on the joint which adversely affects the lubricant, and to serve as a hermetically sealed container for lubricant. Such a cover may comprise a tubular structure of any suitable material having the desired degree of flexibility and strength, but when the cover is to contain lubricant the material must be of such a character that it will not be materially affected by oil or grease. Certain types of synthetic rubber, such as "Neoprene" are well constituted for the purpose. In that embodiment of the invention here illustrated the cover comprises a tubular structure adapted to extend about the universal joint, to be longitudinally compressed, and anchored in sealing contact with the coupling members of the joint. The tubular structure is substantially cylindrical in form and is free from protuberances or cavities of a character which would render the production of the same, as by molding, difficult. Due to its cylindrical shape the maximum diameter of the cover is not greatly in excess of the diameter of the joint, thus enabling it to be used on installations where, due to restricted space, a cover having a relatively large over-all diameter could not be used. The cylindrical shape of the cover also enables it to be very effectively maintained in compression and the tendency of the compressed cover to expand serves to hold the pivot pins of the joint in firm contact with their bearings and thus greatly reduce the relative movement thereof by vibration to which the joint may be subjected and to correspondingly reduce the wear on the pivot elements. In joints installed on aircraft a very large part of the wear on the pivot elements is due to the relative movement thereof caused by vibration. Further, a tubular structure under compression has no tendency to pull away from the attaching devices.

In the drawings the cover has, for the purposes of illustration, been shown as applied to a universal joint comprising two coupling members 5 arranged end to end and each having at one end a pair of jaws 6, the jaws of each pair being in planes intersecting the planes of the jaws of the other pair. A connecting block 7 is interposed between the jaws of both pairs of jaws and is pivotally connected to the jaws of the respective pairs, on intersecting axes, as by pivot pins 8. Each coupling member is provided adjacent the roots of its jaws with a circumferential groove 9.

The cover comprises a substantially cylindrical tubular structure 10 formed of elastic material, such as synthetic rubber, and is of a length greater than the distance between the grooves 9 of the coupling members and has an internal diameter approximating the external diameter of the coupling members. When the tubular structure is in place about the universal joint, as shown in Fig. 3, its end portions overlap the respective grooves 9. As there shown the end portions of the tubular structure extend entirely across the grooves and short distances beyond the same but they may terminate between the side walls of the grooves, the extent of the overlap being determined in part by the extent to which the structure is to be compressed. The tubular structure may fit snugly about the jaws of the coupling member or may be spaced therefrom. When the coupling members are in angular relation one to the other the jaws will engage the cover but the rubber is not easily injured by such contact and friction is practically eliminated by the lubricant in the cover.

In applying the cover to the joint the tubular structure is slipped over the coupling members and one end thereof is attached to the adjacent coupling member. The lubricant is then introduced, the structure longitudinally compressed and the other end thereof attached to the other coupling member. The compression of the tubular structure may be effected in any suitable manner but, in the present instance, it is effected, in part at least, by the second attaching operation, the attaching device being of such a character that it will exert longitudinal pressure on the structure. In the construction here shown the attaching devices for the two ends of the structure are identical and either end thereof may be attached first. In its preferred form the attaching device comprises an annular radially compressible member 11, formed of a suitable metal and having a cylindrical portion 12 to extend about the end portion of the tubular structure and a radial flange 13 at that end opposite the tubular structure. The flange slidably supports the device on the barrel of the coupling member and the cylindrical device is moved over the adjacent end portion of the tubular structure, the inner surface of said cylindrical portion being beveled at its forward end to facilitate its movement over the end of the structure. The flange 13 engages the end of the tubular structure and pressure is applied to the attaching device to longitudinally compress the tubular structure until the beveled inner edge of the flange extends about the groove 9. The attaching device is then radially compressed, as by a suitable collet, thus pressing a portion of the tubular structure into the groove and compressing the same therein to establish tight sealing contact thereof with the base and forward end wall of the groove. During the compression of the attaching device the beveled edge of the flange 13 enters the groove and engages the rear wall thereof, thus exerting additional forward pressure on the attaching device and the tubular structure. The beveled end of the cylindrical portion of the attaching device extends forwardly beyond the groove and the radial compression of the attaching device forces a portion of the rubber forwardly beyond the beveled end thereof and thus exerts an additional longitudinal compressing force on the tubular structure. The flange 13 of the attaching device having been pressed into the groove locks the same and prevents the expansion of the compressed tubular structure. The deformation of the end portion of the structure by the radial compression thereof interlocks the same with the forward wall of the groove and establishes a very strong connection between the structure and the coupling member.

The longitudinal compression distorts the tubular structure and causes portions thereof to buckle and it is desirable that the buckling be controlled as to direction and location. For the purpose of so controlling the buckling of the structure while retaining the cylindrical shape thereof I prefer to provide the same with one or more, usually two, internal circumferential grooves 14 spaced longitudinally one from the other and from the ends of the structure. By thus reducing the thickness of, and thereby weakening, the grooved portions of the structure it is caused to buckle outwardly along predetermined circumferential lines, as shown at 15 in Fig. 1. When the joint rotates with the coupling members in angular relation one to the other each longitudinal section of the structure is successively expanded and contracted and due to the compression of the structure, as well as the buckled or outwardly deflected portions thereof, the one side of the structure will expand without subjecting the same to tension, and the contraction of the other side of the structure increases the compression and buckling of that side thereof with only a slight inward deflection of the intermediate portion of the structure.

The tubular structure having been compressed and anchored to the coupling members tends constantly to expand and thus exerts force on the coupling members tending to move the same longitudinally in outward, or rearward, directions and thus maintains the pivot pins in firm contact with the bearings, and prevents, or greatly reduces, the relative movement of the pivot elements by the vibrations of the joint and materially reduces the wear on the joint due to such vibrations. Because of its longitudinal compression the tubular structure does not tend to pull away from the attaching devices thereby minimizing the danger of a leak developing at one of the attaching devices. While the buckled portions of the structure are relatively shallow they are of sufficient depth to prevent them from being eliminated from one side of the structure by the expansion of that side by the rotation of the joint with the coupling members in their usual angular relation. If the coupling members are at a sharp angle one to the other the buckling may be eliminated from the extended side of the structure but even then the expanded side of the structure will not be under appreciable tension. Another advantage of the present cover is that it offers a minimum of resistance to the relative movement of the coupling members about their pivotal axes. The tubular structure being in compression will be expanded on one side by the expansion of the rubber without resisting the relative movement of the coupling members, such as results from the stretching of the rubber when the cover is in tension or is in neither tension or compression. The contraction of the opposite side of the cover is effected by further buckling thereof which offers very little resistance to the relative movement of the coupling members. A further advantage of the cover is that it is well adapted for application to a universal joint comprising a plurality of joint units connected in tandem.

The cylindrical character of the tubular structure enables the same to be produced at a low cost, preferably by molding, as shown in Fig. 4. As there shown, the mold comprises a base member 15 having a vertical cylindrical cavity 16 of a diameter and length corresponding to the external diameter and the length of the tubular structure. The mold core is in the form of a cylindrical plunger 17 carried by a ram 18 and provided with circumferential ribs 19 corresponding in size and shape to the internal grooves which are to be formed in the external structure. In the molding operation a slug of soft uncured rubber is placed in the cavity 16 and the core 17 is inserted in the cavity under pressure, thus forcing the rubber from beneath the core and causing it to flow upwardly about the core until the space between the core and the wall of the cavity is filled. The molded structure is then cured and stripped from the core, its elasticity permitting it to be easily moved over the shallow ribs 19. In this manner the tubular structure can be very quickly and accurately formed, preferably in a multiple mold, with a small amount of labor and with a minimum of defective pieces.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In a universal joint, two coupling members connected one with the other for relative movement about a plurality of axes, a cover comprising a longitudinally compressible cylindrical tubular structure of elastic material supported on said coupling members in longitudinal compression and having an intermediate circumferential portion deflected radially beyond the exterior cylindrical surface of said structure by said longitudinal compression, and attaching devices extending about the respective end portions of said tubular structure, connecting said end portions with said coupling members and retaining said structure in said longitudinal compression.

2. In a universal joint, two coupling members connected one with the other for movement about a plurality of intersecting axes, each member having a circumferential groove spaced from said axes, a cover comprising a substantially cylindrical tubular structure of elastic material supported about the connected end portions of said coupling members in longitudinal compression and having end portions of substantially uniform thickness extending into said grooves, said tubular structure having longitudinally spaced circumferential portions deflected radially slightly beyond the exterior cylindrical surface of said structure by the longitudinal compression of the latter, and attaching devices extending about the respective end portions of said tubular structure in firm contact therewith, holding the same in sealing contact with the walls of said grooves and maintaining said structure in longitudinal compression.

3. A cover for a universal joint of the type comprising two coupling members connected one with the other for movement about a plurality of intersecting axes, said cover comprising a longitudinally compressed substantially cylindrical structure of elastic material having end portions extending about the respective coupling members and having a circumferentially weakened portion deflected radially beyond the exterior cylindrical surface of said structure by the longitudinal compression of the latter, and attaching devices engaging said end portions of said structure, maintaining the same in a compressed condition and securing said end portions in sealing engagement with said coupling members.

4. A cover for a universal joint of the type comprising two coupling members connected one with the other for movement about a plurality of intersecting axes, said cover comprising a longitudinally compressed substantially cylindrical tubular structure of elastic material having end portions extending about the respective coupling members and having internal circumferential grooves, the grooved portions of said structure being buckled outwardly by the longitudinal compression of said structure, and attaching devices engaging the end portions of said structure, maintaining the same in a longitudinally compressed condition and retaining said end portions in sealing engagement with said coupling members.

5. A cover for a universal joint of the type comprising two coupling members connected one with the other for movement about a plurality of intersecting axes, each member having a circumferential groove spaced from said axes, said cover comprising a longitudinally compressed substantially cylindrical tubular structure having end portions extending into said grooves and also having an interior circumferential groove, the grooved portion of said structure being buckled outwardly by the longitudinal compression of said structure, and annular attaching devices embracing the respective end portions of said structure and under tension due to the reaction of the rubber, said attaching devices maintaining said structure in compression and retaining the end portion thereof in the grooves in said coupling members and in firm sealing contact with the walls of said grooves.

6. A cover for a universal joint of the type comprising two coupling members connected one with the other for movement about a plurality of intersecting axes, each member having a circumferential groove spaced from said axes, said cover comprising a longitudinally compressed substantially cylindrical structure of elastic material the end portions of which extend into said grooves, and also having an internal circumferential groove, the grooved portion of said structure being buckled outwardly by the longitudinal compression thereof, and annular attaching devices embracing the respective end portions of said structure and under tension due to the reaction of the rubber, said attaching devices maintaining said structure in a longitudinally compressed condition and retaining the end portions thereof in said grooves of said coupling members and in firm sealing contact with the walls of said grooves, each attaching device having a part engaging the adjacent end of said structure and extending into the groove in the adjacent coupling member to lock said attaching device against axial displacement.

GEORGE B. STILLWAGON, Jr.

REFERENCES CITED

The following references are of record in the file of this patent:

UNITED STATES PATENTS

| Number | Name | Date |
|---|---|---|
| 550,047 | Kerr | Nov. 19, 1895 |
| 680,328 | Henderson | Aug. 13, 1901 |
| 1,558,503 | Pressler | Oct. 27, 1925 |
| 2,264,728 | Stillwagon, Jr., et al. | Dec. 2, 1941 |

FOREIGN PATENTS

| Number | Country | Date |
|---|---|---|
| 128,376 | Great Britain | of 1919 |